L. BORTH.
FENCE STRUCTURE.
APPLICATION FILED JUNE 10, 1908.
916,834.
Patented Mar. 30, 1909.
2 SHEETS—SHEET 2.
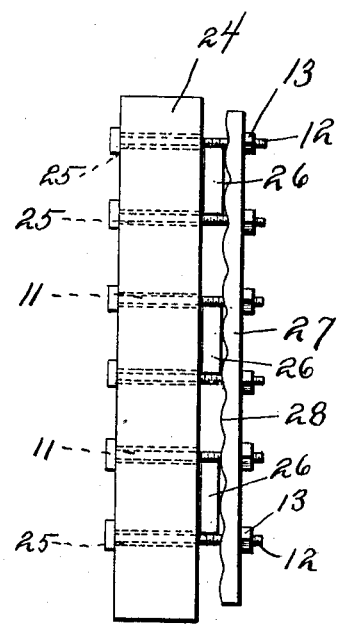
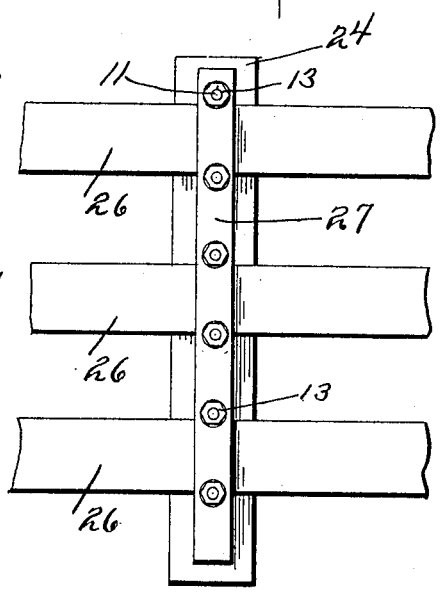
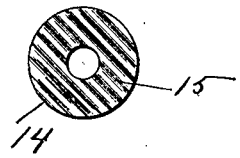
Witnesses
E. E. Johansen
E. L. Chandler
Inventor
Leona Borth.
By Woodward & Chandlee
Attorney

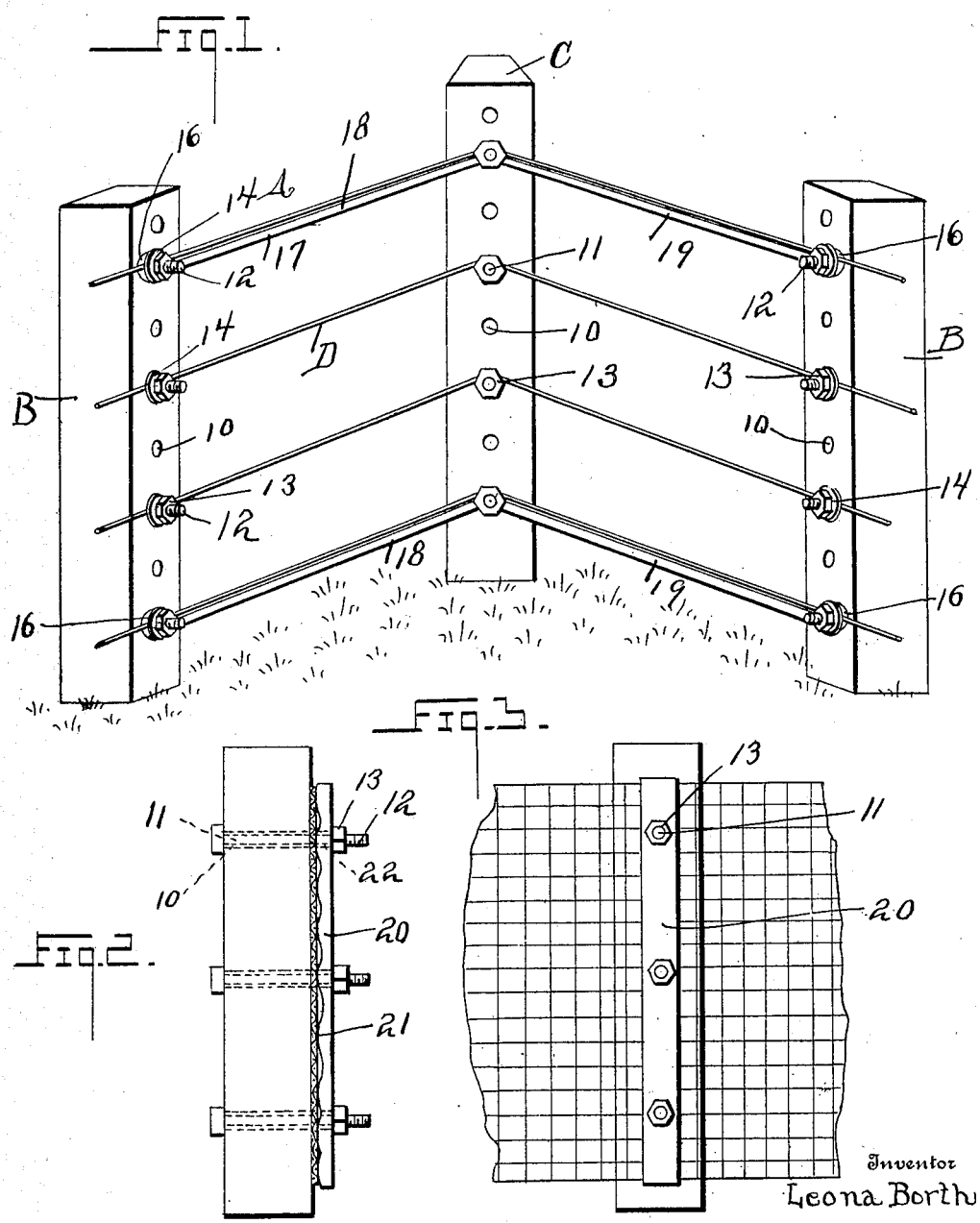

UNITED STATES PATENT OFFICE.

LEONA BORTH, OF HERREID, SOUTH DAKOTA.

FENCE STRUCTURE.

No. 916,834.      Specification of Letters Patent.      Patented March 30, 1909.

Application filed June 10, 1908. Serial No. 437,752.

*To all whom it may concern:*

Be it known that I, LEONA BORTH, a citizen of the United States, residing at Herreid, in the county of Campbell and State of South Dakota, have invented certain new and useful Improvements in Fence Structures, of which the following is a specification.

This invention relates to the class of fences, and has for an object to provide a structure including wire clamping means whereby fence wires may be conveniently and securely held to the posts.

Other objects and advantages will be apparent from the following description and it will be understood that changes in the specific structure shown and described may be made within the scope of the claim without departing from the spirit of the invention.

In the drawings forming a portion of this specification, and in which like characters of reference indicate similar parts in the several views, Figure 1 is a perspective view of a fence structure showing the application of the present invention thereto, Fig. 2 is an end view of a modified form of my invention, Fig. 3 is a front elevational view of the same, Fig. 4 is an end view of a further modified form of my invention, Fig. 5 is a front view of the same, Fig. 6 is a plan view of one of the washers.

Referring now more particularly to the drawings, there is shown a portion of a fence structure A including line posts B and a corner post C. The line and corner posts respectively are each provided with a plurality of horizontally disposed passages 10 for the reception of bolts 11. The bolts 11 are threaded at their outer ends as shown at 12, and are thus arranged to receive correspondingly threaded clamping nuts 13. The bolts are each provided with a washer plate 14 having serrated inner faces 15. The bolts 11 are also arranged to receive headed portions 16 of brace members 17 comprising angularly disposed arms 18 and 19 respectively which are thus arranged for engagement with the corner post and with the line post adjacent to the corner post as will be seen from Fig. 1 of the drawings.

In use, line wires D are disposed inwardly of the serrated faces of the washer plates, and it is obvious that upon movement of the clamping nuts which are carried by the bolts the washer plates will be moved toward the outer faces of the post whereby their serrated faces may be effectively engaged with the line wires to hold the same against casual displacement. It may be stated that the fence wires are disposed between the headed portions 16 of the braces and the washer plates, whereby the line wires will be frictionally engaged between said plates and said headed portions to prevent injury to the post.

The posts are preferably of the concrete type, but a device as herein set forth and described may be equally effective when used with posts of any structure.

In Figs. 2 and 3 of the drawings, I omit the washer plates previously described and employ longitudinally disposed strips 20 having serrated inner faces 21. The strips are also provided with passages 22 for the reception of the bolts 11. The bolts 11 are provided with clamping nuts 23 for frictionally engaging the outer faces of the strips 21. It will thus be seen that a fence formed of fabric material may be disposed over the bolts, and the strips 21 may be disposed outwardly of the fabric material, whereupon the clamping nuts may be operated to tightly engage the serrated faces of the strips with the material.

In Figs. 4 and 5 of the drawings there is shown a post 24 provided with a plurality of passages 25 for the reception of the bolts 11, and in this form of my invention I provide longitudinally disposed planks 26. It will thus be seen that the planks are disposed with their edges above and below the passages formed in the post whereby fastening bolts are arranged to hold said planks against movement in an upward or downward direction. In this form of my invention I provide a strip 27 similar to the strip 21 which is also provided with a serrated face 28 for engagement with the outer faces of the planks. It will of course be understood that the bolts receive clamping nuts as previously described.

It will thus be seen that a simple, strong and durable fence post is provided wherein its fence structure is securely held in place.

What is claimed is:—

In a fence structure, the combination with line and corner posts, of angularly disposed brace members having headed portions engaged with the posts, said headed portions having passages therein, said posts having passages therein formed in line with the passages in the heads of said brace members, bolts disposed in said passages, clamping nuts carried by said bolts, and plates engaged with said bolts and having serrated inner faces arranged to frictionally hold line wires between said plates and said headed portions of said brace members.

In testimony whereof I affix my signature, in presence of two witnesses.

LEONA BORTH.

Witnesses:
R. M. SLOCUM,
JAKOB BORTH.